Mar. 13, 1923.
T. E. RICHARDS.
WINDSHIELD CLEANER.
FILED JAN. 26, 1922.
1,448,003.
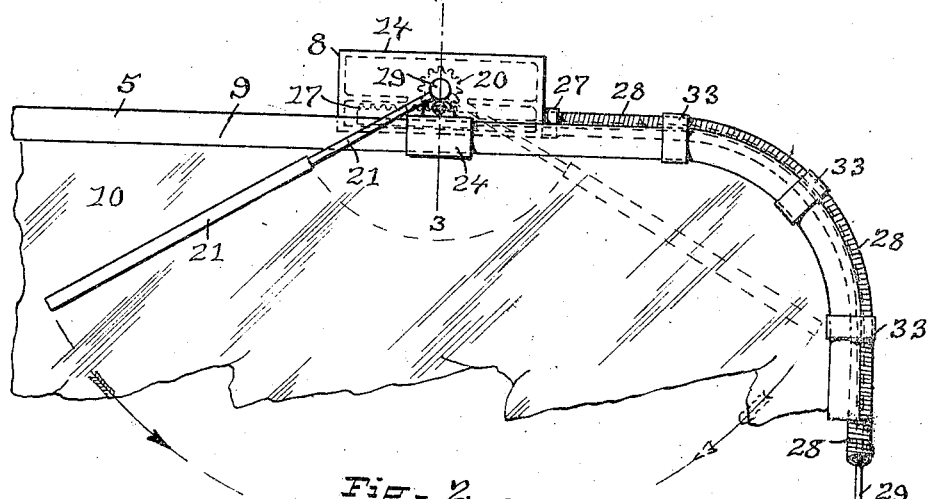
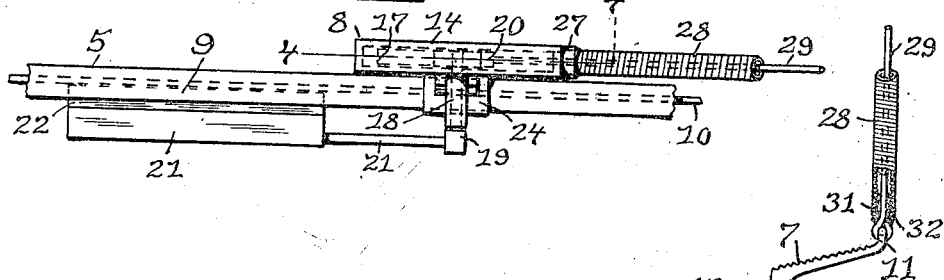
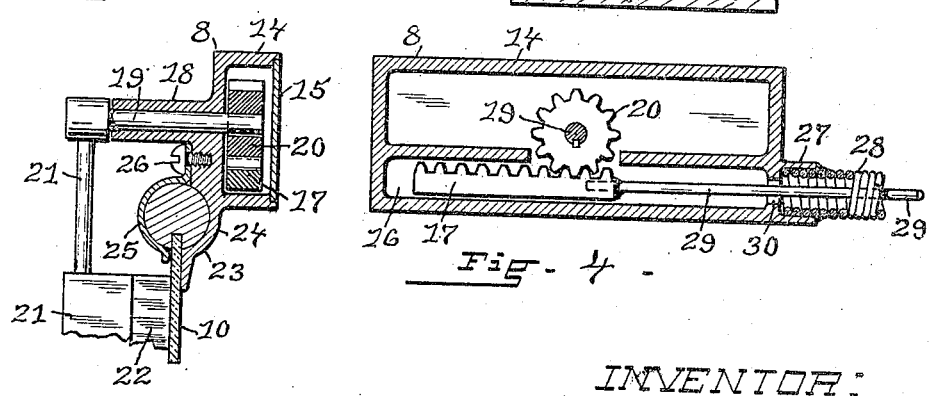
INVENTOR:
Thomas E. Richards
by Chas. H. Luther
ATTORNEY:

Patented Mar. 13, 1923.

1,448,003

UNITED STATES PATENT OFFICE.

THOMAS E. RICHARDS, OF PROVIDENCE, RHODE ISLAND, ASSIGNOR OF ONE-THIRD TO SIMON SILVERMAN AND ONE-THIRD TO HARRY REUBEN ROSEN, BOTH OF PROVIDENCE, RHODE ISLAND.

WINDSHIELD CLEANER.

Application filed January 26, 1922. Serial No. 531,961.

*To all whom it may concern:*

Be it known that I, THOMAS E. RICHARDS, a citizen of the United States, residing at Providence, in the county of Providence and State of Rhode Island, have invented a new and useful Improvement in Windshield Cleaners, of which the following is a specification.

In the usual construction of wind-shield cleaners for automobiles, the wind-shield cleaner is operated by hand. This requires that the driver must remove his hand from the steering wheel and reach forward to operate the wind-shield cleaner and this may be necessary at times when he should have his hands on the steering wheel.

The object of my invention is to improve the construction of a wind-shield cleaner, whereby the wind-shield cleaner is operated by the foot of the driver and the heretofore undesirable ways of operating the wind-shield cleaner by hand, entirely eliminated.

A further object of my invention is to simplify the construction of such a foot power operated wind-shield cleaner, thereby reducing the cost of manufacturing the same.

My invention consists in the peculiar and novel construction of a wind-shield cleaner operated by foot power, said wind-shield cleaner having details of construction, as will be more fully set forth hereinafter and claimed.

Figure 1 is an outside face view of a portion of an automobile wind-shield provided with my improved foot operated wind-shield cleaner, the greater portion of the foot pedal connecting member being broken away.

Figure 2 is a top view of Figure 1.

Figure 3 is an enlarged transverse sectional view, taken on line 3, 3 of Figure 1, and Figure 4 is an enlarged longitudinal sectional view, taken on line 4, 4 of Figure 2.

In the drawing, 5 indicates a portion of a wind-shield, 6 a portion of the floor of an automobile, 7 a foot pedal and 8 my improved wind-shield cleaner.

The wind-shield 5 has the usual metal frame 9 and glass 10.

The foot pedal 7 has a forward end 11 and is pivotally secured at its floor end 12 to a floor member 13 secured to the floor 6 by a screw, in a convenient position for the foot of the driver.

My improved wind-shield cleaner 8 consists of a rectangular box shaped casing 14 having a cover 15 and a lower compartment 16 in which slides a rack 17. On the back of the casing 14 is a bearing 18 in which is a shaft 19 having a pinion 20 in the casing 14 and which meshes with the rack 17. On the outer end of the shaft 19 is an arm 21 carrying preferably a rubber wiper 22 which rubs on the glass 10 of the wind-shield 5. On the underside of the casing 14 is one part 23 of a clamping member 24 shaped to fit the frame 9 of the wind-shield, and on the opposite side is the other part 25 of the clamping member 24 shaped to fit the frame 9 and secured to the casing 14 by a screw 26, as shown in Figure 3. On the outer end of the casing 14 is a collar 27 to which is secured by solder or other means the upper end of a coiled spring 28 and this coiled spring 28 forms one of the connecting operating means to the foot pedal 7. A wire 29 extends through the entire length of the spring 28, through a hole 30 in the casing 14 and is secured at its upper end, by solder or other means, to the end of the rack 17, as shown in Figure 4 and this wire 29 forms the other connecting operating means to the foot pedal 7. The lower end 31 of the spring 28 is secured to the lower end portion of the wire 29, by solder or other means and the lower end 32 of the wire 29 is pivotally secured to the forward end 11 of the foot pedal 7, as shown in Figure 1. The coiled spring 28 is guided through eyes 33, 33 secured to the frame 9 of the wind-shield 5 in any well known way.

The operation of my improved wind-shield cleaner is as follows. The arm 21 is held normally under spring tension by the spring 28, in the position, as shown in full lines in Figure 1, with the wiper 22 bearing on the outside of the glass 10. A downward pressure of the foot on the pedal 7 pulls the wire 29 downwards, against the tension of the spring 28 and through the rack 17, pinion 20, shaft 19 and arm 21 the wiper 22 wipes across the glass and removes rain or moisture from the glass. On removal of the foot from the pedal the contraction of the spring causes a retrograde movement of the operating parts and the wiper wipes back to its normal position.

Having thus described my invention I claim as new:—

1. A foot operated wind-shield cleaner comprising a casing having a bearing, a shaft in the bearing and having on one end a pinion in the casing and on the other end an arm having a wiper adapted to bear on the glass of a wind-shield, a rack in the casing and meshing with the pinion, a foot pedal, a coiled spring secured at one end to the casing, a wire extending through the coiled spring and secured at one end to the rack and at the other end to the foot pedal, the other end of the coiled spring being secured to the wire, means for securing the casing to a wind-shield frame and means for guiding the coil spring around the edge of the wind-shield, for the purpose as described.

2. A foot operated wind-shield cleaner comprising a casing having a bearing, a shaft in the bearing and having on one end a pinion in the casing and on the other end an arm having a wiper adapted to bear on the glass of a wind-shield, a rack in the casing and meshing with the pinion, a foot pedal, a coiled spring secured at one end to the casing, a wire extending through the coiled spring and secured at one end to the rack and at the other end to the foot pedal, the other end of the coiled spring being secured to the wire, for the purpose as described.

In testimony whereof, I have signed my name to this specification.

THOMAS E. RICHARDS.